May 5, 1964
J. MILLIGAN
3,132,195
CASTING SYNTHETIC RESINS
Filed Feb. 8, 1960
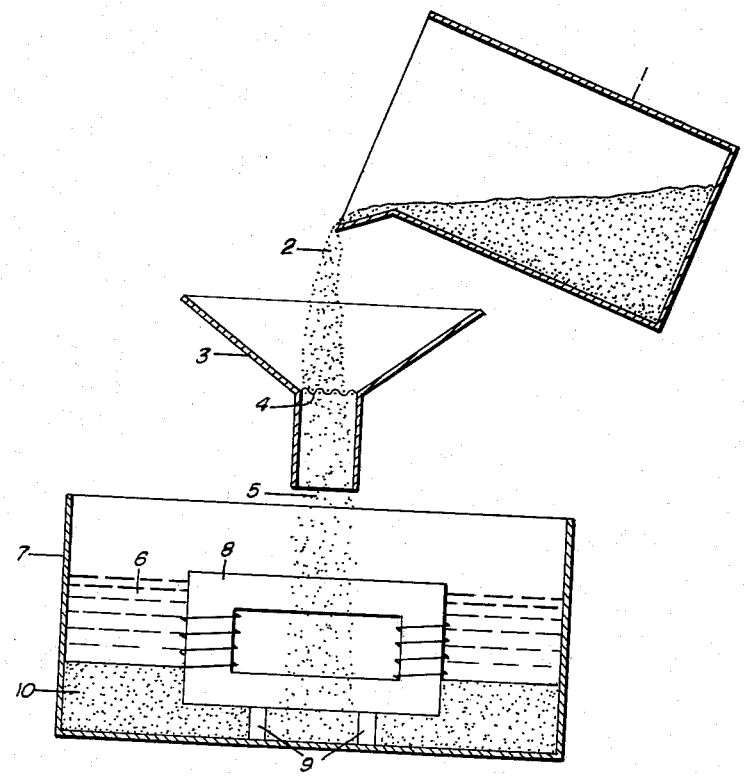
INVENTOR
JOHN MILLIGAN

United States Patent Office 3,132,195
Patented May 5, 1964

3,132,195
CASTING SYNTHETIC RESINS
John Milligan, Blackpool, England, assignor to M.G. Plastics Limited, Blackburn, England
Filed Feb. 8, 1960, Ser. No. 7,110
Claims priority, application Great Britain Feb. 11, 1959
10 Claims. (Cl. 264—272)

This invention relates to the casting of cold-setting synthetic resins, that is to say, processes in which a liquid synthetic resin is fed into a receptacle and then caused to set by catalytic action without any substantial application of heat. Such processes include not only the moulding of synthetic resins by casting in moulds, but especially potting process in which an article generally an electrical component, is embedded in the synthetic resin.

It is well known that casting can be effected with liquid epoxy or alkyd resins compounded with filler such as silica sand. This is a common method of potting, but generally the resin has to be heat cured and entrained air has to be removed in vacuo. The use of the relatively expensive, low-viscosity epoxy resins has gained ground because the alkyd resins (usually styrenated unsaturated alkyds) shrink unduly, even after the heat-curing step has been completed.

An object of the invention is to enable casting to be effected without the need for vacuum filling techniques and without the need for curing at elevated temperatures. A further object is to enable potting, especially of transformers, to be effected with improved penetration or conformity of the resin into or with the potted article.

The invention consists in a process of casting a cold-setting synthetic resin, which comprises feeding the liquid resin into a receptacle and then adding through the exposed surface of the resin a mixture of heavy granular filler, catalyst and an inert liquid compatible with the resin, in which the inert liquid is present in an amount sufficient only to wet the surface of the filler so that the mixture forms a damp crumbly mass. The expression "heavy" here means that the wetted granular filler should be able to fall through the liquid resin in a time which is a fraction of that taken for the resin to set under the influence of the accompanying catalyst. The expression "inert" means that the liquid does not interfere with the catalyst or the catalysis of the polymerization process and is itself not resinified to any substantial extent by the catalyst.

The preferred resin is a styrenated alkyd resin. The preferred filler is sand, and may be used in an amount substantially to fill the resin, that is to say, to reach or nearly reach the resin surface on settling. The mixture of filler, catalyst and liquid may be prepared by tumbling the ingredients. The liquid may conveniently be a plasticiser for the resin.

In one example, 100 parts of unsaturated alkyd resin and 25 parts of styrene constitute the casting resin; the filler mixture is made by tumbling 100 parts of dry sand, 4 parts of a glycol ether ester plasticiser and 6 parts of benzoyl peroxide.

It has been found preferable, when employing an alkyd resin, to have present both the amine-reactive type and the cobalt-reactive type, with the respective accelerators. This enables widely differing curing conditions to be catered for. A further example, using such a mixed resin, is as follows:

One hundred parts of a blended unsaturated styrenated alkyd resin containing both an amine-reactive type and a cobalt-reactive type together with amine and cobalt accelerators (all as commercially available) are added to a vessel ("pot") housing an electrical component so as to immerse the same apart from electrical connections to the component. A filler mixture is then streamed into the resin, made by tumbling 100 parts of dry sand, 4 parts of dimethyl phthalate, ¾ part of benzoyl peroxide and ¾ part of cyclohexanone peroxide.

The filler is most suitably added to the resin as a stream preferably through a mesh to break up aggregates, without so much build-up on the surface that the resin is blanketed with filler; in this way air release is facilitated. A wide-mouth, meshed funnel has been found the most satisfactory.

The plotting operation just described is illustrated by the accompanying drawing. In this drawing, the sand, previously tumbled with the dimethyl phthalate, benzoyl peroxide and cyclohexanone peroxide, is poured from a receptacle 1 as a stream 2 into a wide-mouthed funnel 3. This funnel incorporates a mesh 4 for the purpose of breaking up agglomerations. From the funnel, the damp sand emerges as a stream 5 which is allowed to flow directly into a body of liquid styrenated alkyd resin 6 housed in a receptacle or pot 7 within which an electrical component 8 is supported by means of stems or lugs 9. The damp sand flows straight through the surface of the resin and builds up as a lower layer 10 within the pot 7. The operation is completed when the top of the layer 10 coincides with the top of the liquid resin 6, the resin then being filled with the sand whilst the electrical component 8 is completely embedded.

A feature of this invention is that robust vessels for the resin are unnecessary for potting purposes. Electrical junctions and/or equipment can be potted satisfactorily using receptacles of flexible material such as paper, papier mâché or thin plastic which can be made more cheaply than the traditional ceramic "pots"; gaps may be stopped temporarily with conformable material such as putty or modelling clay. Individual joints may be potted before the whole joint or apparatus is immersed, or conventional roping or screw thimbles may be used.

Although the resins used according to the present invention are cold-setting, this does not preclude the application of heat where accelerated setting is desired, or in very cold situations.

I claim:
1. A process of casting a cold-setting, solventless synthetic resin, which comprises feeding the liquid resin into a receptacle and then adding through the exposed surface of the resin a mixture of heavy granular filler, catalyst and an inert liquid compatible with the resin, in which the inert liquid is present in an amount sufficient only to wet the surface of the filler so that the mixture forms a damp crumbly mass.

2. A process according to claim 1 in which the resin comprises an unsaturated alkyd, the catalyst comprises an organic peroxide and the inert liquid is a plasticiser for the resin.

3. A process according to claim 1 in which the filler is used in an amount sufficient substantially to fill the resin.

4. A process according to claim 1, in which an electrical component is embedded in the resin.

5. A process according to claim 1, in which the filler mixture is streamed through the surface of the resin without blanketing said surface.

6. A process according to claim 5 in which the filler mixture is streamed from a sieving means.

7. A process according to claim 4 in which said receptacle is of flexible material.

8. A process according to claim 7 in which said material comprises paper or papier mâché.

9. A process according to claim 1 in which the resin employed is a blend of unsaturated styrenated alkyd resins containing both an amine reactive resin and a cobalt reactive resin together with respective amine and cobalt accelerators.

10. A process according to claim 9 in which the filler comprises a blend of 100 parts of dry sand with about 4 parts of dimethyl phthalate, about ¾ part of benzoyl peroxide and about ¾ part of cyclohexanone peroxide.

References Cited in the file of this patent

UNITED STATES PATENTS

| | | |
|---|---|---|
| 1,935,885 | Meissner | Nov. 21, 1933 |
| 1,947,085 | Hill et al. | Feb. 13, 1934 |
| 2,456,228 | Weaver | Dec. 14, 1948 |